United States Patent Office 3,450,212
Patented June 17, 1969

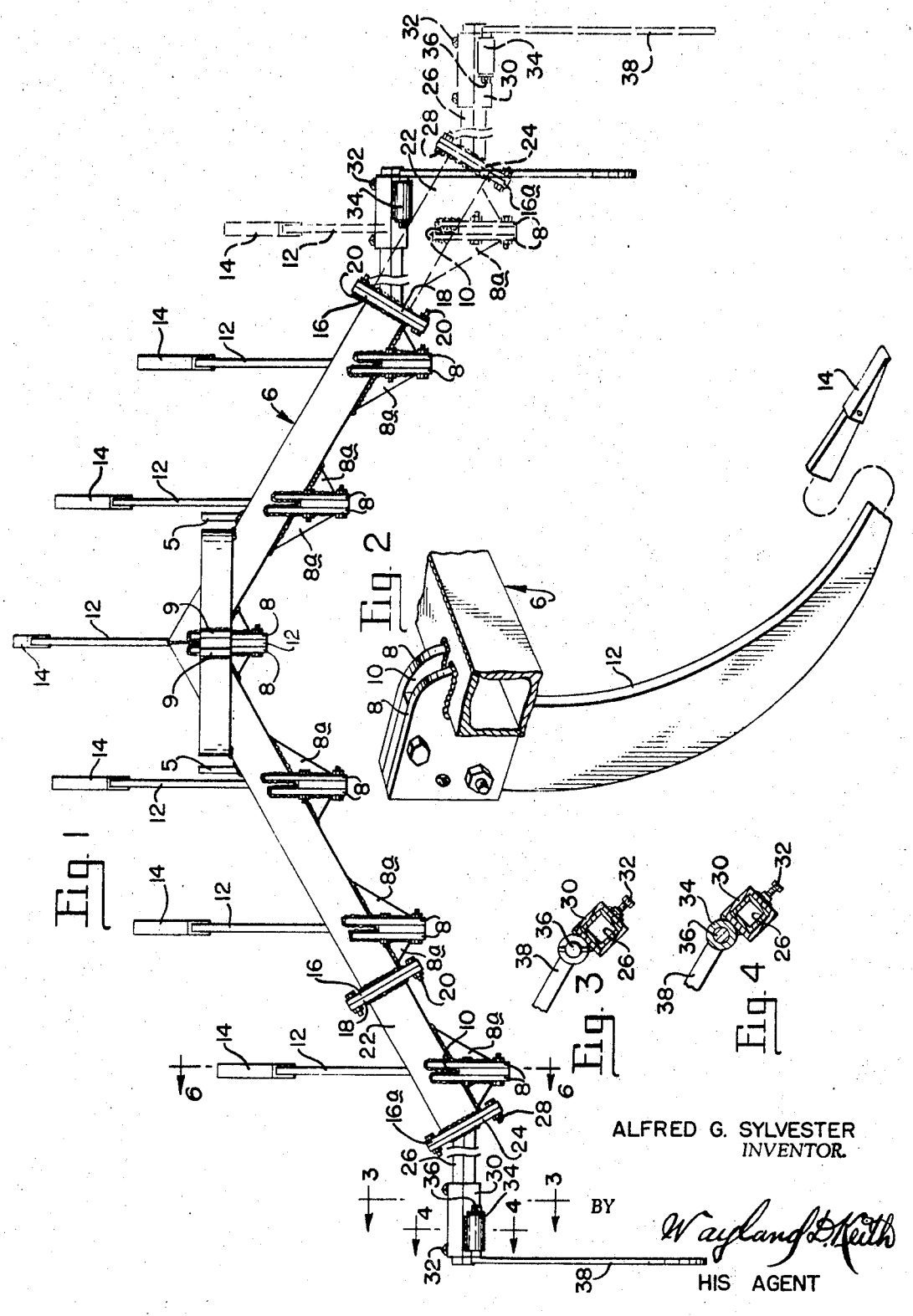

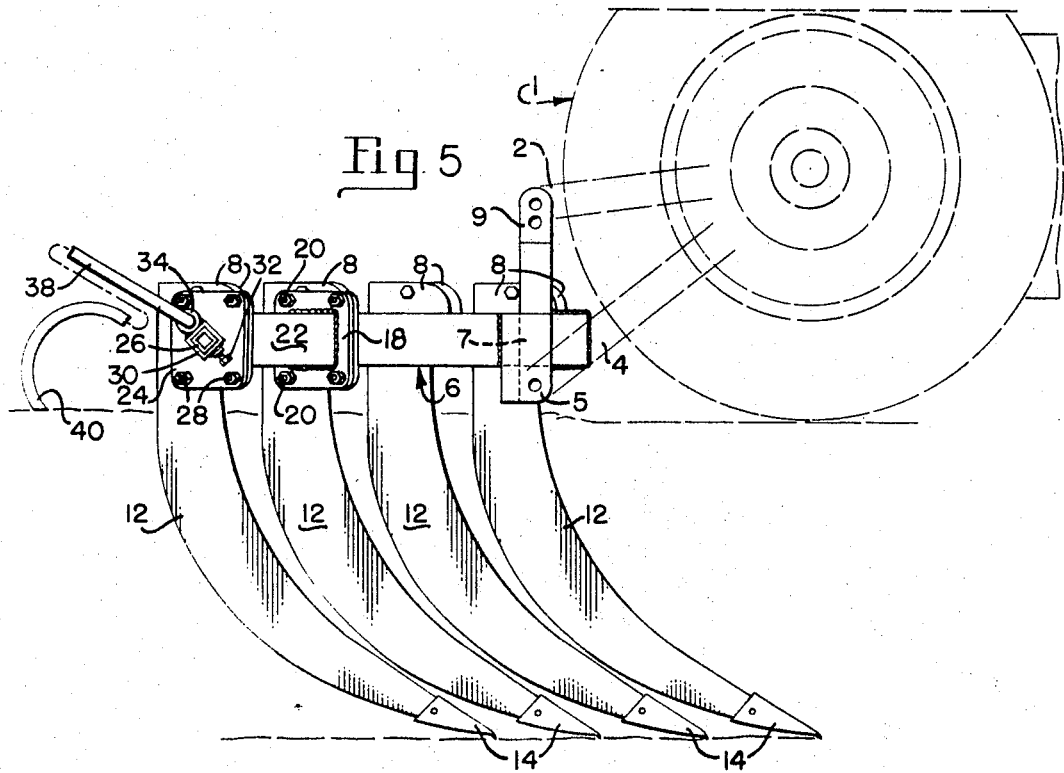
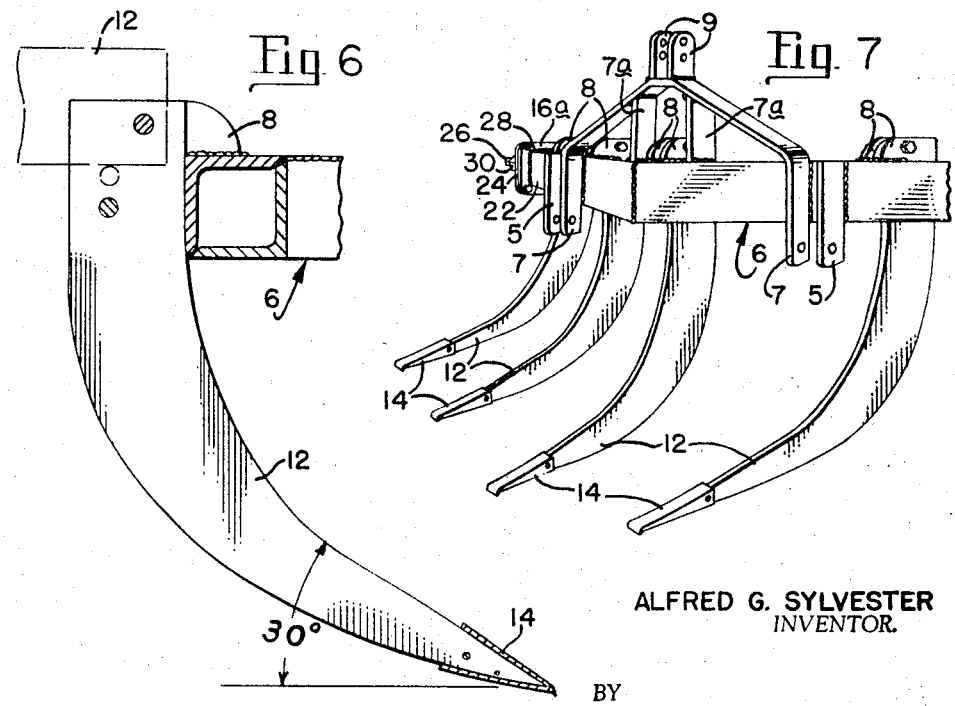
ALFRED G. SYLVESTER
INVENTOR.

3,450,212
MULTIPLE TOOTH SUBSOIL PLOW
Alfred Glenn Sylvester, P.O. Box 964,
Avoca, Tex. 79503
Continuation of application Ser. No. 405,445, Oct. 21, 1964. This application Oct. 18, 1967, Ser. No. 681,043
Int. Cl. A01b 13/08, 29/06, 33/16
U.S. Cl. 172—699     11 Claims

ABSTRACT OF THE DISCLOSURE

A subsoil plow with multiple, soil engaging teeth, which teeth are arranged on a frame which diverges rearwardly and outwardly. The soil engaging teeth being curved downwardly and forwardly and terminating in an angulated wedge point to lift the soil as the teeth move therethrough. The forward or lead tooth initially breaks the soil, then each successive tooth, rearward and to a side thereof, loosens the soil of each succeeding land, which enables the soil for the entire width acted upon by the teeth, to be easily crumbled inward toward the central or lead furrow, initially opened by the lead tooth. Provision is made for marking the area traversed to enable more accurate coverage of the area being plowed.

---

This invention relates to subsoil plows, and more particularly to subsoil plows which require a minimum of drawbar pull to obtain a maximum of subsoil plowing with respect to depth and area.

Various subsoil plows and rippers have been proposed heretofore, but many of these had the teeth or plows thereof so designed as to waste considerable power, due to the soil impacting on the leading face of the plow shank, without obtaining the benefit of lifting the soil in such manner as to enable the plow shank of the subsoil plow to be pulled through the earth with a minimum of power, and also utilize additional plow shanks spaced in such manner as to crumble the soil between the second and succesive plows and the lead plow which makes the first break in the soil.

The present subsoil plow is so designed as to be connected directly onto a conventional tractor, such as a farm tractor, and is so connected thereto that it may be readily manipulated with the conventional power lift, which is usually hydraulic, to enable the subsoil plow to be raised and lowered, so as to be gauged to the desired depth in the soil.

An object of this invention is to provide a subsoil plow with the shank thereof being so shaped as to engage the soil at an angle to lift the soil by a wedging action to enable the conservation of power.

Another object of the invention is to provide a multiple toothed, subsoil plow, with the teeth so arranged that the teeth on each side of the lead tooth will obtain the benefit of the breaking action of the soil by the lead tooth which is immediately ahead of the other teeth.

Still another object of the invention is to provide a subsoil plow which may have teeth added thereto and still obtain the same continuity of action.

Yet another object of the invention is to provide a subsoil plow which has outwardly extending, adjustable guide markers thereon to enable the terrain to be marked for subsequent passes thereover, as the subsoil plow is moved over the terrain by a traction element.

A still further object of the invention is to provide a shear bolt connection for a subsoil plow shank, which enables the use of a bolt of such size as to shear, should the strain become too great.

Another object of the invention is to provide an apparatus for holding certain of the teeth of the subsoil plow in raised position when all of the teeth are not to be used.

Still another object of the invention is to provide an extension for a subsoil plow frame, in modular sections, which are relatively light in weight for the load the plow will withstand.

Yet a further object of the invention is to provide a subsoil plow which is low in the cost of manufacture, easy to assemble and disassemble, and simple in construction and operation.

With these objects in mind, and others which will become manifest as the description proceeds, reference is to be had to the accompanying drawings in which like reference characters designate like parts in the several views thereof, in which:

FIG. 1 is a top plan view of the subsoil plow shown apart from the tractor, with parts being broken away and shortened to bring out the details of construction, and with parts shown in dashed outline to show interchangeability of parts;

FIG. 2 is a perspective view of a portion of the subsoil plow beam, showing a plow shank holding socket, with a plow shank secured within the socket by bolts, and showing the plow shank extending downward therefrom with a part thereof broken away and shifted upward, as indicated by dot-dash outline;

FIG. 3 is a sectional view taken on the line 3—3 of FIG. 1, looking in the direction indicated by the arrows, with parts broken away;

FIG. 4 is a view similar to FIG. 3, but of a section taken at a different point on FIG. 1;

FIG. 5 is a side elevational view of the subsoil plow shown in plowing position, and showing a portion of the tractor associated therewith, the power lift arms being shown in dashed outline, a marker being shown as attached to the frame of the subsoil plow, a portion of which marker having been broken away and moved forward, as indicated by dot-dash outline;

FIG. 6 is a sectional view taken on the line 6—6 of FIG. 1, looking in the direction indicated by the arrows, with a portion of the frame being broken away, and showing a fragmentary portion of the plow shank in raised position and supported above the terrain; and FIG. 7 is a fragmentary, perspective view taken from the front and a side, with some of the main frame and some of the teeth being being broken away.

With more detailed reference to the drawings, the numeral 1 designates generally a traction element, such as a farm tractor having the conventional power lift bars 2 and 4 attached thereto for raising and lowering conventional agricultural implements. The numeral 6 designates generally the main frame of the subsoil plow, which frame is in the form of a V and diverges from a medial point rearwardly, and has vertical, parallel plates 8 welded to the top and rear faces thereof to form sockets 10 between the spaced apart, parallel plates, each of which sockets receives a plow shank or tooth 12 therebetween, in close fitting relation, so that the forward or leading edge of the plow shank will be immediately adjacent the rear side of the main frame 6. The plow shanks of the teeth 12 are secured in the sockets between their respective plates by means of bolts or pins of a size to shear if the strain on the tooth becomes too great. The spaced apart, vertical, parallel plates are parallel to the normal line of travel.

The main frame 6 has a downwardly extending, apertured lug 5 secured on each side of the center thereof, which lugs are vertical and parallel. Spaced inwardly from each lug 5 is a lower portion of bar 7, which portions are parallel to the lugs 5, are spaced therefrom, and are secured to the main frame 6. The upper portion of bar 7 extends upward and above the main frame 6 to enable apertured lugs 9 to be secured to the bar 7 above the main frame 6 in spaced apart relation with respect to the center. The portions of the bar 7, which extend downward, are apertured so that the apertures therein will register with the respective apertures in lugs 5 to enable apertured power lift bar 4 to be connected therebetween in pivoted relation. The lugs 9, which are secured to bar 7, are apertured, which apertures register with apertures in power lift bar 2 to enable the power lift bar 2 to be pivotally connected thereto, so the main frame 6 can be lifted by power lift bars 2 and 4 by a conventional power lift.

Each plow shank or tooth 12 extends downwardly and forwardly in a curved path, which curve terminates on the upper side into a substantially straight line for approximately one-third the length thereof, with the straight portion or face being inclined downward at a "digging" angle of approximately thirty degrees to the horizontal so as to wedgingly engage the soil to lift the soil upward before the soil comes into abutting contact with the face of the plow shank while the soil is still unbroken. The lower end of each plow shank terminates in a substantially sharp point and preferably has a wear shoe or point 14 thereon, which point 14 is usually hard surfaced with a carbide type material. This point 14 may be resurfaced or replaced when it becomes worn.

The shanks or teeth 12 are designed and positioned on the main frame 6 so that the center shank 12, which is the most forwardly extending, will move below the surface of the soil at an acute angle of approximately thirty degrees with respect to the horizontal, and will lift the soil at the point by a wedging action, which will form a trench which is usually from eight to twenty inches deep. Then the plow shank on each side of the center shank will likewise move beneath the surface of the soil to raise the soil upward in the same manner as the center shank. The lateral spacing of the plow shanks, however, is such that the center shank has loosened the soil, by lifting action, so each adjacent shank breaks or crumbles the soil that was initially broken by the center or first shank, thereby less power is required for the adjacent teeth to be moved through the soil, and the same is true for each successive shank outward from the lead or center shank. In this manner, a five to seven shank subsoil plow can be pulled with less power than if all of the plow shanks were in side-by-side, aligned relation.

The main frame 6 has an apertured plate 16 secured on each end thereof, which is preferably perpendicular to the longitudinal axis of the respective, outwardly diverging portions. It is preferable to have four holes formed in each plate 16, which holes are complementary with holes in plates 18, so that bolts 20 may be passed therethrough. The plate 18 is welded or otherwise secured to a beam 22 which is substantially of the same construction as the main frame 6, which beam 22 forms an extension to each side of the main frame 6, so an extra plow shank may be added to each side. The beam 22 has a socket 10 thereon, composed of plates 8, so, in this manner, as many additional plow shanks 12 may be added as desired. A plate 16a is shown on the outer end of extension beam 22, which plate is identical with plate 16, so additional extension beams 22 may be added, as desired.

Each of the vertical plates 8 have gusset plates 8a secured to the sides thereof and to the inner face of the main frame 6 and to extension beam 22, as will best be seen in FIG. 1. The main frame 6 is preferably made of boxed angles in order to obtain maximum strength with a minimum of weight.

A plate 24 is weldably secured to a tubular member 26, which plate 24 is complementary to plates 16 and 16a, so that the plate 24 may be bolted thereon by bolts 28, so the tubular member 26 will extend outwardly from each end of the main frame 6 or from the extension beam 22, as indicated in dashed and full outlines in FIG. 1. A square tubular member 30 is slid over tubular member 26 and is locked in adjusted position by set screws 32. A round sleeve 34 is welded to the top rear face of square tubular member 30 so as to receive a rod 36 therethrough. A curved arm 38 is welded to rod 36 and extends outward and downward, as will best be seen in FIGS. 1 and 5. The curved arm 38 has a hook-like member 40 on the outer end thereof, which member 40 serves as a drag or scratcher to mark a land for the return trip of the subsoil plow. In this manner the work may be carried on expeditiously, with a minimum of time loss, due to double coverage.

While the invention is shown as having a main frame with five teeth or plow shanks thereon, it is to be understood that the two outer teeth or shanks may be removed to form a three-tooth, subsoil plow, or all of the teeth, except the center tooth 12 may be removed, or these teeth or shanks may be moved into the position, as shown in dashed outline in FIG. 6, with only the center tooth or shank being used as a subsoil plow. Such an arrangement might be desirable for use in rocky or root infested soil. However, in relatively soft soil, five to seven teeth or plow shanks, of the character and design shown herein, may be readily pulled by a conventional farm tractor.

Having thus clearly shown and described the invention, what is claimed as new and desired to be secured by Letters Patent is:

1. A subsoil plow for attachment to a prime mover, which plow comprises;
    (a) a rearwardly and outwardly diverging frame,
        (1) a pair of parallel, spaced apart, vertical plates secured to said frame centrally thereof,
        (2) similar pairs of parallel, spaced apart, vertical plates secured to said frame, at spaced intervals on each side of said centrally positioned plates,
    (b) a downwardly and forwardly curved tooth mounted between each pair of said plates and being detachably secured thereto,
        (1) the lower end of each said tooth extending forward of said frame and terminating in a wedge-shaped point,
    (c) each end of said frame having an apertured plate welded thereto,
        (1) a complementally apertured plate adapted to fit on each apertured plate secured to each end of said frame,
    (d) a frame extension member secured to each complementary plate by welding means,
        (1) each frame extension member having a slidable member mounted thereon,
            (i) means adjustably securing each slidable member to the respective frame extension members,
        (2) a sleeve fitted on each said slidable member to form a bearing,
            (i) a rod extending through said bearing in journaled relation,
    (e) a ground engaging means secured to each said rod for pivotal movement of each said ground engaging means within each said sleeve, to form an adjustable, ground engaging marker.

2. A subsoil plow as defined in claim 1; wherein
    (a) each said ground engaging means forming said marker having a curved, hook-like member secured to the lower end thereof.

3. A subsoil plow as defined in claim 1; wherein
    (a) said frame extension member, secured to each complementary plate, is polygonal in shape, and
        (1) said slidable member, mounted on said frame extension member, is a polygonal tube and is complementary to said frame extension member.

4. A subsoil plow for attachment to a prime mover, as defined in claim 4; wherein
    (a) said polygonal shaped member is rectangular, and
        (1) said polygonal tube is rectangular in shape.

5. A subsoil plow for attachment to a prime mover, comprising:

(a) a rearwardly and outwardly diverging, unitary, rigid frame,
(b) a pair of parallel, spaced apart, vertical plates secured centrally on said frame,
(c) similar pairs of parallel, spaced apart, vertical plates secured to said frame on each side of said center thereof at spaced intervals,
(d) a downwardly and forwardly curved tooth mounted between each pair of said plates and being detachably secured thereto,
  (1) the upper portion of each pair of teeth lying in transverse vertical planes at spaced intervals rearwardly of said first tooth mounted between said first pair of parallel, spaced apart, vertical plates on the center of said frame,
(e) the forward upper side of each tooth being straight, each which tooth extends downwardly and forwardly in a curve for at least a portion of the length thereof and terminating in a wedge point, with the forward edge of the wedge point lying in a horizontal plane, with the included angle of divergence of the wedge point being an acute angle of not more than thirty degrees,
(f) pairs of downwardly depending, apertured lugs secured to the forward side of said diverging, unitary, rigid frame, each said pair of apertured lugs being spaced on each side of a vertical, medial plane passing transversely through said frame at the apex thereof,
(g) a pair of upstanding, apertured lugs secured to said diverging, unitary, rigid frame near the forward side thereof, one of said lugs being on each side of a vertical, medial passing transversely through said frame at said apex,
  (1) said lugs adapted to be pivotally connected to the linkage mechanism of a power lift of the prime mover.

6. A subsoil plow for attachment to a prime mover, as defined in claim 5; wherein
(a) a brace is interconnected between one of said downwardly extending lugs and one of said upstanding lugs, to form a positive connection therebetween.

7. A subsoil plow for attachment to a prime mover, as defined in claim 5; wherein
(a) the apertures in said downwardly depending lugs are a substantial distance below said diverging, unitary, rigid frame,
(b) said apertures in said upstanding lugs are a substantial distance above said diverging, unitary, rigid frame, and
(c) one lug of each pair of said downwardly depending, apertured lugs being interconnected by a unitary member.

8. A subsoil plow for attachment to a prime mover comprising:
a substantially V-shaped frame having a plurality of members rigidly interconnected to form a single frame including a pair of outwardly diverging arms;
a plurality of pairs of spaced apart parallel plates rigidly mounted directly on said arms and extending therefrom generally parallel to the line of travel of said plow to form sockets open at the ends thereof to permit ready mounting access;
a chisel plow tooth having an upper shank mounted in the socket between each pair of parallel plates, the lower portion of each plow tooth being tapered to a point and curved downwardly to extend forwardly with respect to said frame and at an angle to the horizontal,
pin means passing through each of said pairs of parallel plates and each plow tooth to connect the upper shank of each plow tooth to said frame; and
means rigidly connected to said rigid substantially V-shaped frame for attachment to said prime mover.

9. The subsoil plow of claim 8 wherein said pin means shear to release any said plow tooth to pivot rearwardly when an unyielding obstruction is struck in the earth.

10. A subsoil plow for attachment to a prime mover, as defined in claim 8; wherein
(a) said plow teeth are wedge-shaped on the lower ends thereof, and which teeth are parallel to the normal line of travel,
  (1) the forward side of the curve of each downwardly curved plow tooth originating at the lower side of the rigid frame, and being substantially tangent to the upper side of each tooth near the pointed, terminal end of each tooth, and
(b) the bottommost portion of the respective teeth being spaced apart and each forming a diverging, acute angle with respect to the horizontal, when in operative position.

11. A subsoil plow for attachment to a tractor having a three-point hitch connection comprising:
rigid frame means having a forward portion;
at least three chisel plow teeth mounted on said frame means in a V-shaped array with one of said teeth located at the apex of the V-shaped array and adjacent the forward portion of the frame means, and the remaining teeth disposed rearwardly on said frame means from said one tooth, said teeth extending downwardly from said frame means and each of said chisel plow teeth having an upper shank portion and a lower portion, the lower portion of each tooth having a concavely curved forward edge and a convexly and substantially continuously curved rear edge, said front and rear edges converging to a point at the lowermost end of each tooth, said concavely curved, forward edge forming an angle of less than about 30° with the horizontal adjacent said point, and each tooth having a pair of parallel, flat side surfaces extending between said front and rear edges, said teeth as defined by said side surfaces lying in substantially parallel planes which are parallel to the line of travel of the plow;
shear pin means securing each chisel plow tooth to said frame means for releasing any of said teeth to pivot rearwardly on said frame means about a horizontal axis when the point of said released tooth strikes an unyielding obstruction in the earth;
a first pair of parallel, horzontally spaced lugs secured to, and extending upwardly from, the central and forward portion of said frame means for connecting the central hitch link of a three-point hitch connection thereto; and
a second and third pairs of lugs located on opposite sides of, and spaced horizontally from, said first pair of lugs and secured to said frame means for connecting the two outer hitch links of the three-point hitch connection thereto.

References Cited

UNITED STATES PATENTS

| 106,837 | 8/1870 | Landes | 172—690 |
| 828,615 | 8/1906 | Lindgren | 172—691 X |
| 939,761 | 11/1909 | Tucker | 172—690 X |
| 1,202,569 | 10/1916 | Nielson et al. | 172—689 |
| 1,531,643 | 3/1925 | Brewer | 172—744 X |
| 2,752,837 | 7/1956 | Parker | 172—691 X |
| 2,808,772 | 8/1957 | Mabe | 172—451 |
| 3,039,540 | 6/1962 | Ward | 172—451 X |
| 3,052,307 | 9/1962 | Kirschmann | 172—253 |
| 3,120,281 | 2/1964 | Peveler et al. | 172—699 |

ANTONIO F. GUIDA, *Primary Examiner.*

ALAN E. KOPECKI, *Assistant Examiner.*

U.S. Cl. X.R.

172—126, 271, 690, 771

PO-1050
(5/69)

UNITED STATES PATENT OFFICE
CERTIFICATE OF CORRECTION

Patent No. 3,450,212          Dated June 17, 1969

Inventor(s) Alfred Glenn Sylvester

It is certified that error appears in the above-identified patent and that said Letters Patent are hereby corrected as shown below:

In line 71, column 4 in claim 4 "4" should be -3-.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents